J. DUNNER.
CRANKING DEVICE.
APPLICATION FILED NOV. 28, 1914.
1,143,517.
Patented June 15, 1915.
2 SHEETS—SHEET 2.
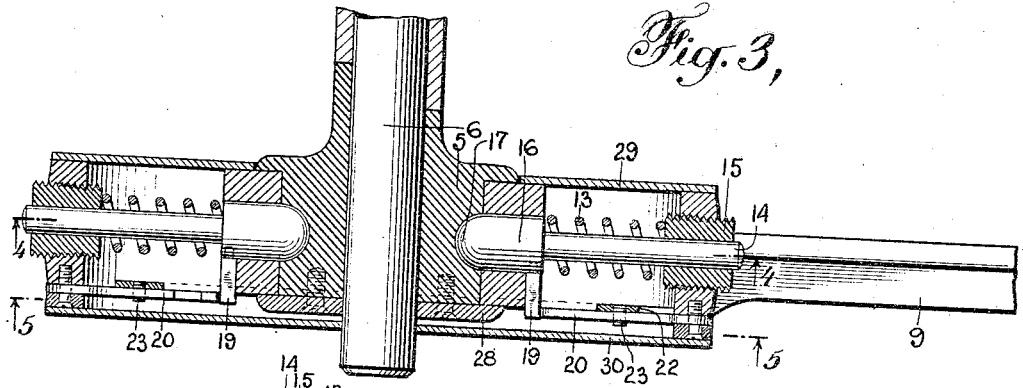
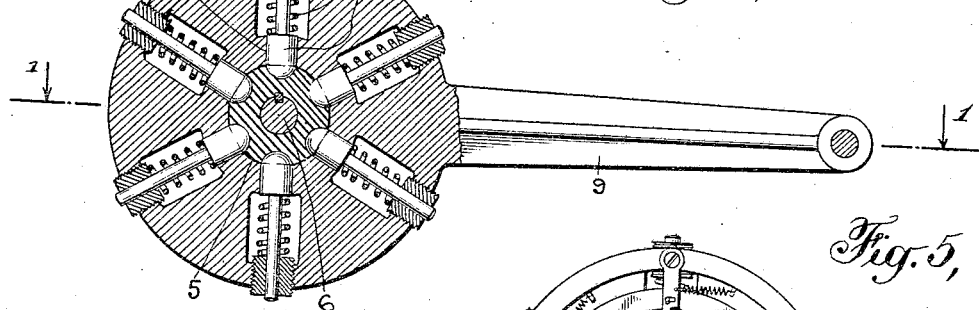
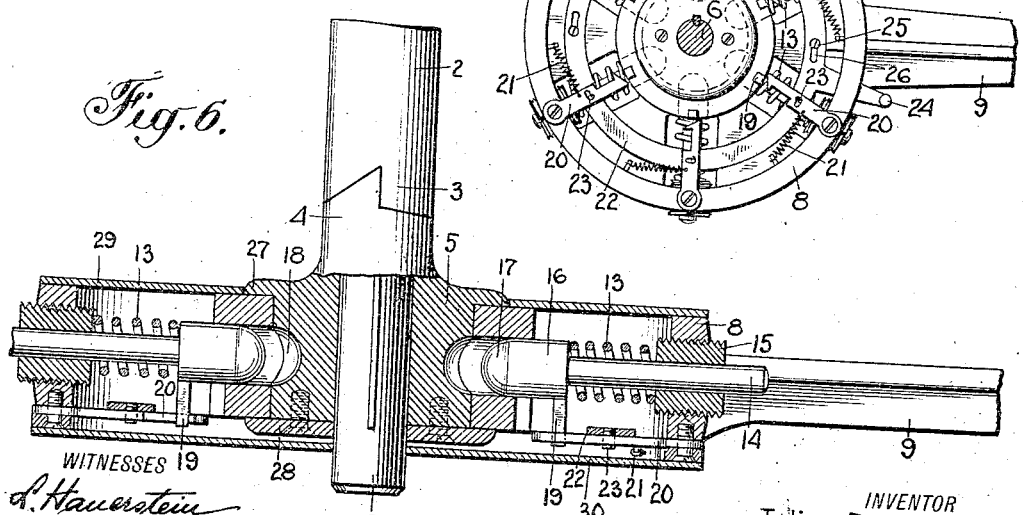
WITNESSES
L. Hauerstein
A. L. Kitchin
INVENTOR
Julius Dunner
BY Munn & Co
ATTORNEYS

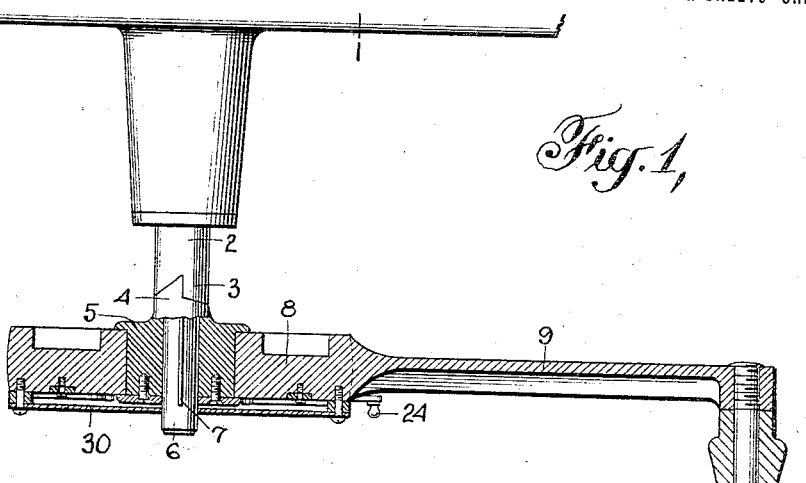
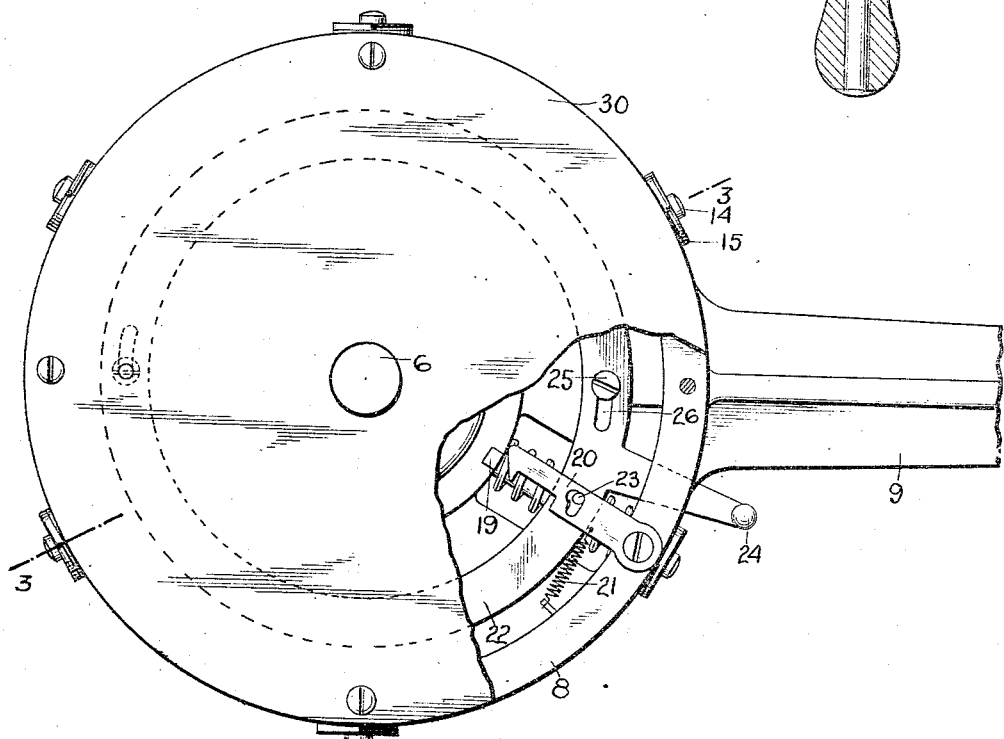

UNITED STATES PATENT OFFICE.

JULIUS DUNNER, OF NEW YORK, N. Y.

CRANKING DEVICE.

1,143,517.   Specification of Letters Patent.   Patented June 15, 1915.

Application filed November 28, 1914. Serial No. 874,497.

*To all whom it may concern:*

Be it known that I, JULIUS DUNNER, a subject of the Czar of Russia, and a resident of the city of New York, borough of Brooklyn, in the county of Kings and State of New York, have invented a new and Improved Cranking Device, of which the following is a full, clear, and exact description.

This invention relates to improvements in cranking devices for cranking explosive engines, and particularly to devices for cranking engines used on automobiles, and has for an object to provide an improved construction which may be operated in the usual manner without any danger of an appreciable kicking effect against the hand.

Another object of the invention is to provide an improved cranking device which may be adjusted to engines of any size so that when the engine kicks backwardly the various parts of the device may give or yield without injuring the operator.

A still further object of the invention is to provide a cranking device with a plurality of spring pressed pawls or pins which resiliently fit into a clutch member, and which normally act against the clutch member for turning over the engine, but which automatically move from the clutch member when the engine backfires.

In the accompanying drawings—Figure 1 is a longitudinal sectional view through an embodiment of the invention on line 1—1 of Fig. 4, the same being shown applied to an engine shaft: Fig. 2 is a front view of the principal parts shown in Fig. 1, the same being shown on an enlarged scale with certain parts broken away for better illustrating the construction; Fig. 3 is a sectional view approximately on line 3—3 of Fig. 2; Fig. 4 is a sectional view through Fig. 3 on line 4—4; Fig. 5 is a sectional view through Fig. 3 on line 5—5; Fig. 6 is a view similar to Fig. 3 except that the parts are shown in an inoperative or retracted position.

Referring to the accompanying drawings by numerals, 1 indicates an engine of any desired kind having a shaft 2 provided with the usual clutch face 3 designed to interlock with the clutch face 4 of what may be termed the bearing member 5 embodying certain features of the invention. The bearing member 5 is rigidly connected with shaft 6 by any desired means, as for instance key 7 so as to continually rotate with shaft 6. The arrangement of the clutch faces 4 and 3 and the way member 5 is mounted on shaft 6 may be varied in a number of ways without departing from the spirit of the invention, the main requisite being some form of connection between bearing member 5 and the engine so that whenever bearing member 5 is rotated the engine will be turned over. The reverse is also true, that is, whenever the engine is operating the bearing member 5 will be rotated. Journaled on bearing member 5 is a body 8 formed integral with or rigidly secured to crank 9 having a suitable gripping member 9', whereby the body 8 may be rotated manually. The body 8 is provided with a plurality of threaded openings 10 and a guiding member 11 arranged in each threaded opening 10. A cut-away portion 12 is also arranged between the threaded apertures 10 and the guiding member 11 so as to guide the various springs 13 which surround the pins 14. Springs 13 bear at one end against an adjustable sleeve 15 and against the sliding head 16 rigidly secured to pin 14. Each of the heads 16 is provided with a rounded lower end 17 adapted to fit into the respective sockets 18 formed in the bearing member 5. Any desired number of pins 14 and associated parts may be provided, six being shown in the drawing in order to illustrate one form of the invention.

It will be noted that the various springs 13 press against heads 16 so as to resiliently hold the rounded ends 17 in the sockets 18. By an adjustment of the sleeves 15 the tension of springs 13 may be varied for causing a greater or less amount of pressure necessary to move the heads 16 out of the bearing member 5. If it requires, for instance, a pressure of, say, sixty pounds against the gripping member 9' for turning over the engine, the tension of the various springs 13 must be adjusted so as to hold the heads 16 in sockets 18 under said pressure. If for any reason the engine should kick back the quick rearward turning of the bearing member 5 would merely cause the heads 16 to move out of the sockets 18 as the springs 13 are set for only slightly more than a sixty pound pressure. As soon as the heads 16 move out of their sockets against the action of springs 13, the respective lugs 19 rigidly connected with the heads 16 are engaged by the hooks 20, which hooks are pivotally mounted on the outer part of the body 8. This partially holds the heads 16 and associated parts in a retracted or inoperative position.

It will be noted that each of the hooks 20 is provided with a spring 21 for holding the hooks normally in a predetermined position, but allowing a resilient movement therefrom when the lugs 19 move outwardly, and also when the ring 22 is partially rotated. The ring 22 is provided with a pin 23 for each of the hooks 20 so as to move the hooks 20 out of engagement with the lugs 19 and thereby allow the heads to resume their engagement with bearing member 5. A suitable hand operated lever 24 is provided for permitting ready operation of the ring 22. As shown in Figs. 2 and 5 pins 25 are also provided which extend through slots 26 for limiting the movement of ring 22.

As shown in Fig. 6 the bearing member 5 is provided with an annular flange 27, and also with a plate 28 which may be removed, plate 28 and flange 27 overlapping somewhat the body 8 so as to provide a track for properly supporting body 8, and for preventing body 8 and associated parts from becoming disconnected with the bearing member 5. Whenever the hooks 20 are in engagement with the lugs 19 the device cannot be operated for turning over the engine. On a proper movement of lever 24, the hooks will be disengaged from lugs 19 and the heads 16 will automatically move into engagement with the bearing member 5, whereupon crank 9 may be operated for turning over the engine, which when turned over will cause a rotation of bearing member 5 and a rotary outward movement of the heads 16 which will again become locked in their outer position. If the engine should backfire the only result would be that the heads 16 would be forced outwardly and the lugs 19 into engagement with hooks 20 which would necessitate a manual release thereof before the engine could be properly turned over. While the engine is running the body 8 and associated parts swing freely on the bearing member 5 so as to always be in place whenever it is desired to crank the engine.

In order that the various parts may not be clogged with dirt or other foreign matter a protecting plate 29 is secured to what may be termed the rear face of the body 8 and a covering plate 30 is secured to the front face of body 8, these plates being preferably held in place by suitable screws as shown in Fig. 2.

What I claim is:—

1. In a cranking device of the character described, a bearing member connected with the shaft of an engine, a body rotatably mounted on said bearing member, a plurality of spring pressed members arranged in said body and engaging said bearing member, a lock for each of said spring pressed members for holding said spring pressed members out of engagement with said body when moved therefrom and a single manually actuated member for disengaging said locks from said spring pressed members.

2. In a cranking device for engines, the combination with the engine shaft, of a bearing member connected therewith, said bearing member having a plurality of notches, a rotatable body arranged on said bearing member, a plurality of reciprocating members having rounded ends fitting into said notches, said reciprocating members being arranged to move in said body with the end projecting into said notches, a spring for each of said reciprocating means for resiliently pressing the reciprocating means into engagement with said bearing member, a plurality of pivotally mounted hooks, and means extending from each of said reciprocating members for engaging said hooks for locking the reciprocating members out of engagement with said bearing member when moved therefrom.

3. In a cranking device of the character described, a bearing member adapted to be connected with the shaft of an engine, said bearing member being formed with a pair of flange members and with a plurality of sockets, a manually operated body loosely mounted on said bearing member with parts projecting into the space between said flanges whereby said body is loosely held in place on said bearing member, a plurality of reciprocating pins arranged in said body, each of said pins having rounded heads adapted to be inserted into said notches, a spring pressing against each of said heads for normally pressing the same into said notches, means for varying the tension of said springs, a stop or lug projecting from each of said heads, and a locking member adapted to engage said pin or projection when moved radially until said heads have moved out of said notches, whereby said body is disconnected from said bearing member.

4. In a device of the character described, a bearing member provided with a plurality of notches in the periphery thereof, a manually operated body journaled in said bearing member, a plurality of spring pressed reciprocating pins arranged in said body, each of said pins having a rounded head, there being one pin for each of said notches, whereby said heads are adapted to fit into said notches, a threaded sleeve surrounding part of each of said pins, said threaded sleeve being adjustable and bearing against the springs acting on said pins, whereby the tension of said springs may be varied, a lug projecting from each of said heads, a hook for each of said lugs adapted to engage said lugs and hold the heads out of engagement with said bearing member, and manually operated means for disconnecting said hooks from said lugs.

5. In a cranking device of the character described, a bearing member adapted to be connected with the shaft of an engine, said bearing member having a plurality of rounded notches therein, a manually operated body arranged on said bearing member, a crank member for actuating said body, a plurality of reciprocating spring pressed pins arranged on said body, and adapted to project into said notches, the ends of said pins extending into said notches being rounded, whereby a pressure greater than the tension of the springs will cause the pins to move radially out of said notches, a hook co-acting with each of said pins for locking the same in a position out of engagement with said bearing member, a manually operated ring, and a pin extending from said ring and engaging each of said hooks for unlocking the hooks from said pins.

6. In a device of the character described, a bearing member adapted to be connected with the shaft of an engine, a manually operated body journaled in said bearing member, spring pressed traction members carried by said body and partially engaging said bearing member whereby whenever said body is rotated and said traction members are in engagement with said bearing member the bearing member will also be rotated, a lug projecting from each of said bearing members, a pivotally mounted hook adapted to engage said lugs when the traction members are moved out of contact with said bearing members, and manually actuated means for simultaneously disengaging all of said hooks from all of said lugs or projections so as to release said traction members.

In testimony whereof I have signed my name to this specification in the presence of two subscribing witnesses.

JULIUS DUNNER.

Witnesses:
A. L. KITCHIN,
PHILIP D. ROLLHAUS.